United States Patent
Fleischmann (10) Patent No.: US 8,371,287 B2
(45) Date of Patent: Feb. 12, 2013

(54) SOLAR COLLECTOR REFLECTOR SYSTEM

(76) Inventor: Lewis W. Fleischmann, Pikesville, MD (US)

( * ) Notice: Subject to any disclaimer, the term of this patent is extended or adjusted under 35 U.S.C. 154(b) by 0 days.

(21) Appl. No.: 13/295,929

(22) Filed: Nov. 14, 2011

(65) Prior Publication Data

US 2012/0055463 A1   Mar. 8, 2012

Related U.S. Application Data (63) Continuation-in-part of application No. 12/662,086, filed on Mar. 30, 2010, now abandoned.

(60) Provisional application No. 61/202,745, filed on Mar. 31, 2009.

(51) Int. Cl.
   *E04D 13/18* (2006.01)
(52) U.S. Cl. ........ 126/628; 126/629; 126/585; 126/595; 126/623
(58) Field of Classification Search ............. 126/585, 126/595, 623, 628, 629
   See application file for complete search history.

(56) References Cited

U.S. PATENT DOCUMENTS

| | | | |
|---|---|---|---|
| 3,012,294 A | 12/1961 | Waidor | |
| 3,048,375 A | 8/1962 | Walker | |
| 3,972,316 A * | 8/1976 | Alkasab | 126/643 |
| 4,054,125 A | 10/1977 | Eckels | |
| 4,112,918 A | 9/1978 | Palkes | |
| 4,128,095 A * | 12/1978 | Oren et al. | 126/675 |
| 4,141,338 A * | 2/1979 | Lof | 126/674 |
| 4,191,168 A | 3/1980 | Allen et al. | |
| 4,202,322 A | 5/1980 | Delgado et al. | |
| 4,203,424 A | 5/1980 | Coxon et al. | |
| 4,262,657 A * | 4/1981 | McCullough et al. | 126/617 |
| 4,304,220 A | 12/1981 | Brockhaus | |
| 4,320,155 A | 3/1982 | Gillery | |
| 4,426,995 A * | 1/1984 | Wilson | 126/625 |
| 4,532,091 A | 7/1985 | Dias et al. | |
| 4,561,221 A | 12/1985 | McKee | |
| 4,766,941 A * | 8/1988 | Sloop et al. | 160/241 |
| 5,052,150 A | 10/1991 | Chen | |
| 5,601,074 A * | 2/1997 | Eckart | 126/561 |
| 6,000,170 A | 12/1999 | Davis | |
| 6,234,166 B1 | 5/2001 | Katsir et al. | |
| 6,792,938 B2 | 9/2004 | Komano et al. | |
| D534,488 S * | 1/2007 | Rosene et al. | D13/102 |
| 2004/0055593 A1 | 3/2004 | Besier | |

FOREIGN PATENT DOCUMENTS

SU              932144 B       5/1982

* cited by examiner

*Primary Examiner* — Kenneth B Rinehart
*Assistant Examiner* — Jorge Pereiro (57) ABSTRACT

The solar collector-reflector system includes at least one modular solar panel arranged singly or in an array, each solar panel having a solar collector-reflector assembly, a driver for selective collection or reflection of solar energy, attachment assembly, mounting assembly, ducting and a controller for controlling the solar energy collection and reflection configuration based on the sensed differential temperature between the solar panel or array and a dwelling set temperature. The solar collector-reflector assembly has surfaces that either collect or reflect solar energy, and the solar collector-reflector system utilizes air-to-air heat transfer to provide additional heating to an existing ducting system in the dwelling or reflect solar flux from the roof, thereby reducing heating and cooling energy consumption and costs.

13 Claims, 15 Drawing Sheets

SOLAR COLLECTOR REFLECTOR SYSTEM

CROSS REFERENCE TO RELATED APPLICATIONS

This is a continuation-in-part of my prior application Ser. No. 12/662,086, filed on Mar. 30, 2010 now abandoned, which claims the benefit of U.S. Provisional Patent Application Ser. No. 61/202,745, filed Mar. 31, 2009.

BACKGROUND OF THE INVENTION

1. Field of the Invention

The present invention relates to solar energy devices, and more specifically, to a solar collector-reflector system that may be used as a means to regulate the temperature in a dwelling while also using the system as an additional heat source for household systems.

2. Description of the Related Art

Currently, feasible and cost-effective alternative energy sources are in high demand due to the costs of limited natural resources such as fossil fuels and coal, both to the consumer as well as the producer. The costs for maintaining energy consumption for heating and cooling a typical home is on the rise. Two of the existing solutions for this issue involve solar panels. While they may provide adequate additional energy resource, the first photovoltaic systems are expensive and inefficient, and invertors are required to convert DC to AC power. Another method is using ethylene glycol/water systems that require a separate liquid to air heat exchanger to transfer solar heat to the dwelling and/or hot water heating system. While adequate, installation is costly due to the additional hardware.

Thus, a solar collector reflector array system solving the aforementioned problems is desired.

SUMMARY OF THE INVENTION

The solar collector-reflector system includes at least one modular solar panel arranged singly or in an array, each solar panel having a solar collector-reflector assembly, a driver for selective collection or reflection of solar energy, attachment assembly, mounting assembly, ducting and a controller for controlling the solar energy collection and reflection configuration based on the sensed differential temperature between the solar panel or array and a dwelling set temperature. The solar collector-reflector assembly has surfaces that either collect or reflect solar energy, and the solar collector-reflector system utilizes air-to-air heat transfer to provide additional heating to an existing ducting system in the dwelling or reflect solar flux from the roof, thereby reducing heating and cooling energy consumption and costs.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
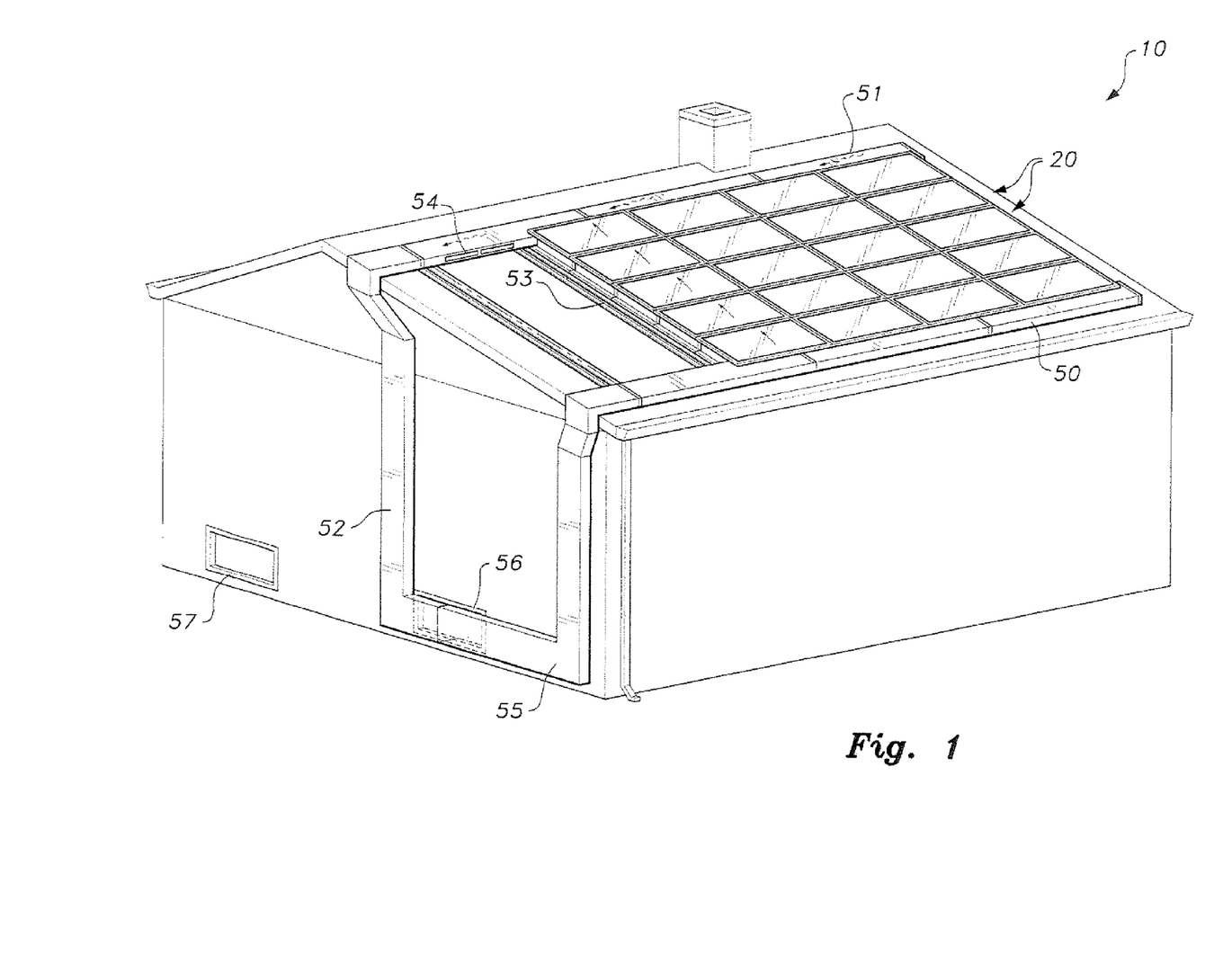
FIG. 1 is an environmental, perspective view of a solar collector-reflector system according to the present invention.
Figure 2:
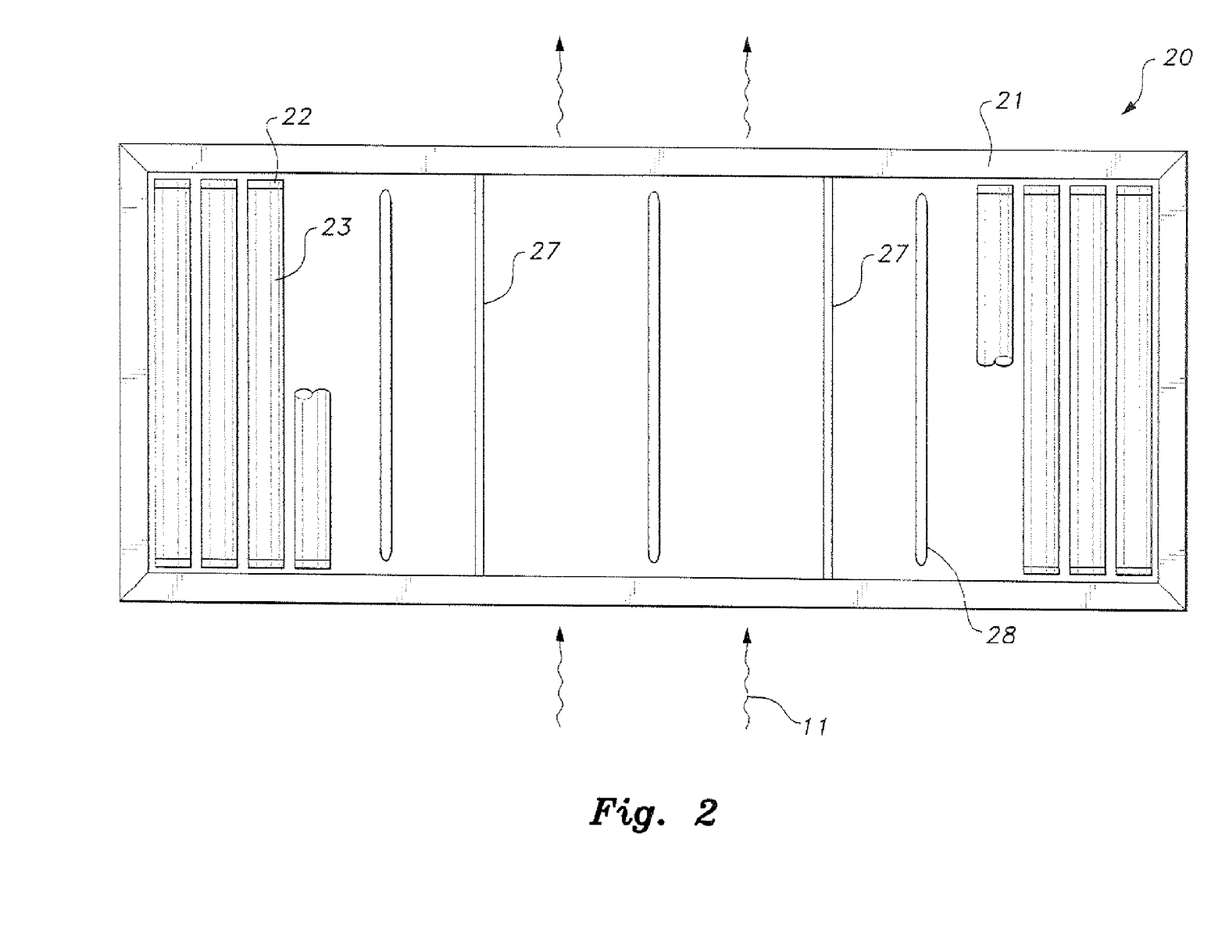
FIG. 2 is a top view of a modular solar panel of a solar collector-reflector system according to the present invention.

The present invention relates to a solar collector-reflector system that selectively collects or reflects solar energy and uses air-to-air heat transfer to provide either additional heating or enhanced cooling resource to an existing household air conditioning system and thereby reduce energy costs. Referring to FIGS. 1 and 2, the solar collector-reflector system 10 includes a plurality of solar panels 20 arranged in an array on a roof of a household or dwelling and ducting 50, 51 to direct air through the array and the dwelling. Each modular solar panel 20 includes a solar panel housing 21 and a plurality of solar collector-reflector tubes 23 having end caps 22. The solar panel housing 21 may be composed of aluminized Vinyl plastic or polished aluminum channel frame members. Polished aluminum or Vinyl cross braces 27 may be provided within the frame to support the Plexiglas cover 39 and prevent sagging of the same during the heating mode. To connect adjacent solar panels 20, a coupling 30 is used to connect the shaft 29 to a corresponding shaft from the adjacent solar panel. Each coupling 30 includes pins 30' slidably inserted into slot 29' of the shaft 29. These couplings 30 permit synchronized rotation of all the tubes 23 in the array of solar panels 20.

Figure 3:
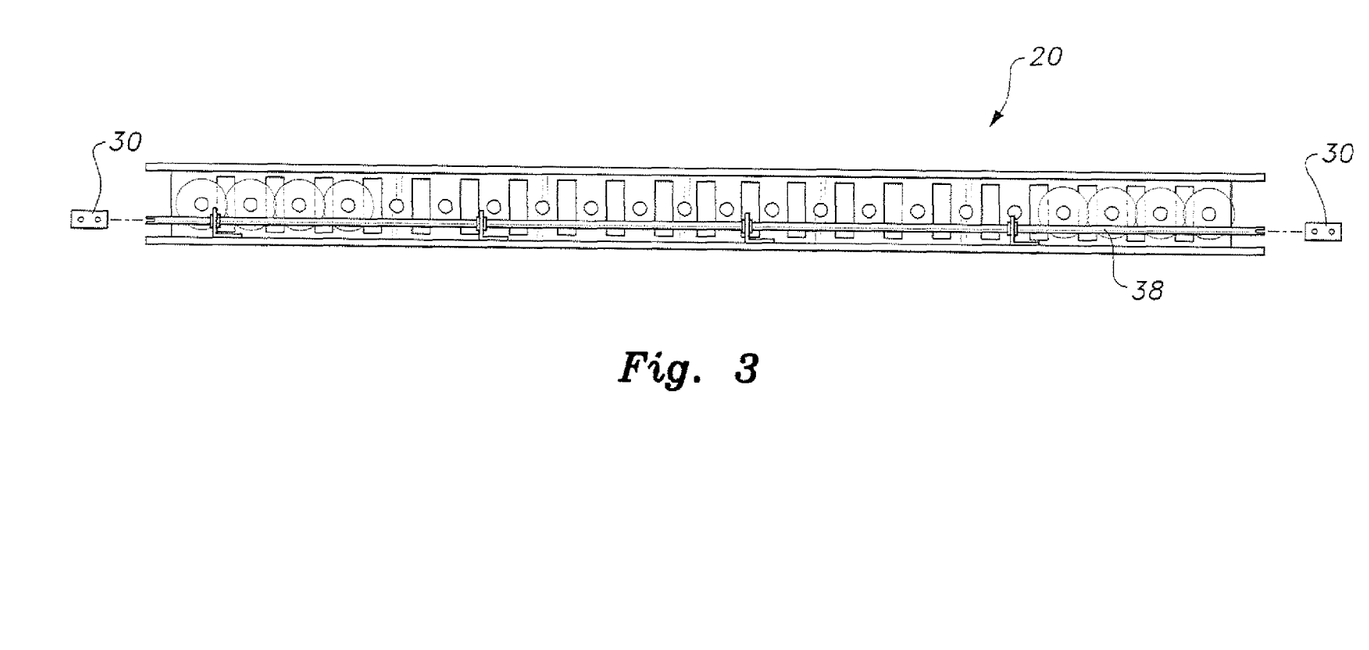
FIG. 3 is a side view of the modular solar panel of a solar collector-reflector system according to the present invention.
Figure 4:
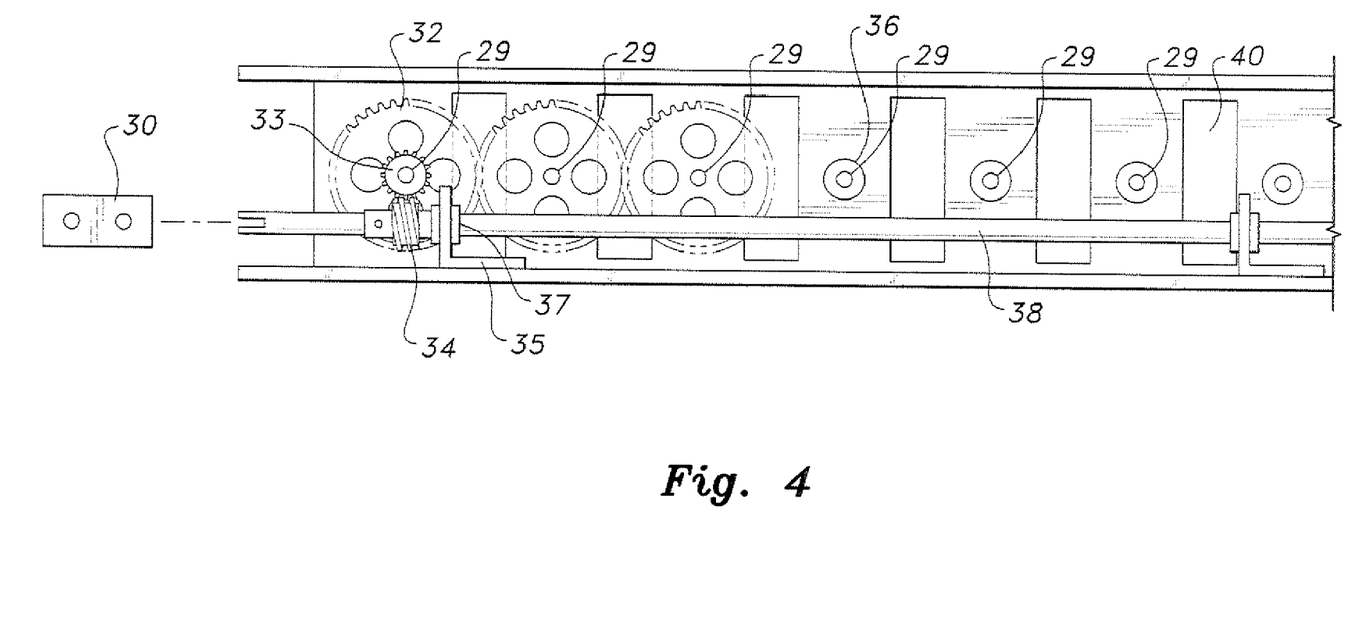
FIG. 4 is an enlarged partial side view of the modular solar panel of a solar collector-reflector system according to the present invention.
Figure 5:
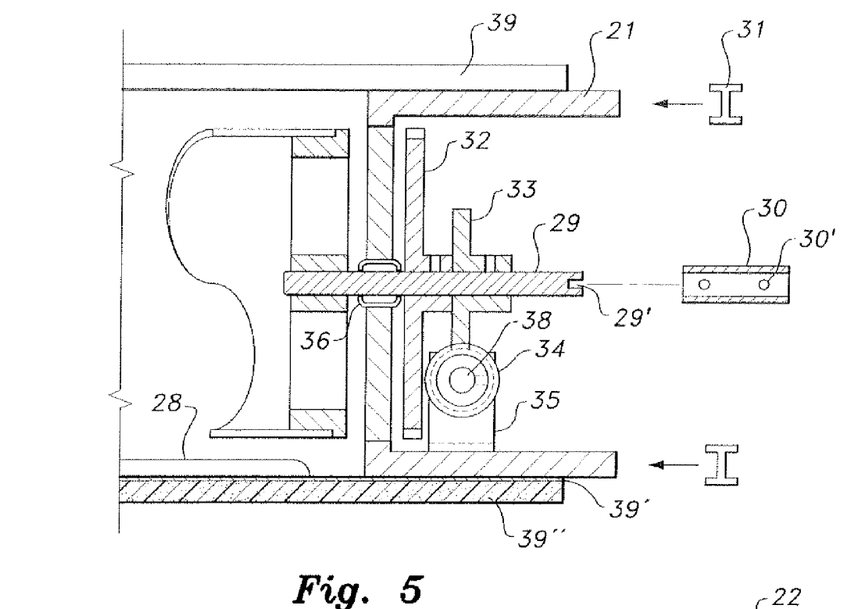
FIG. 5 is an enlarged partial side view in section of the modular solar panel according to the present invention, showing the driver for a solar collector-reflector system.

To drive the tubes 23, attention is directed to FIGS. 3-5. As shown in the Figures, coupling 30 engages a drive torque rod 38 that runs the full length of the solar panel frame. Spaced bearing support angles 35 include needle roller bearings 37 to support the torque rod 38 along its length. Each horizontal gang of solar panels can be powered by one gear motor drive in place of one of the end couplings 30. Since each horizontal row of ganged solar panels are also coupled to the next abutting horizontal row of panels via couplings 30, and since all tubes 23 also rotate within very low friction needle roller bearings 36 mounted within the bracket holding the shaft 29, one gear motor provides enough torque to drive all panels simultaneously. A precision worm gear 34 drives gear 33 to rotate a tube 23 at one end of the solar panel via shaft 29. Every shaft 29 in the bank of tubes 23 has a spur gear 32. The spur gears 32 mesh all the tubes in the bank together, thereby providing equal and synchronized rotation of all the tubes 23. Synchronized rotation may be accomplished by other means, such as a chain drive or pulley type system. However Nylon spur gears are inexpensive and provide a more positive and lighter weight function. The long channels include a plurality of openings 40, which permit air to flow across and parallel to the tubes 23, as well as through the tubes 23, due to the holes 26 formed on each of the end caps 22.

Each solar panel 20 includes an aluminum or Vinyl bottom 39' embossed with integral ribs 28 to provide rigidity. A Styrofoam sheet 39" may be provided beneath the bottom 39' for thermal insulation.

Figure 6:
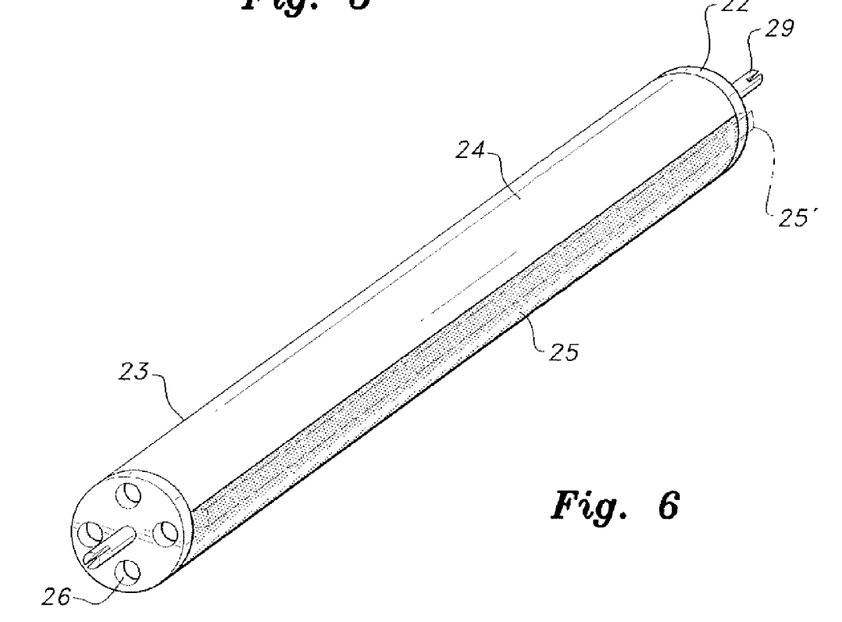
FIG. 6 is a perspective view of a solar collector-reflector tube of a solar collector reflector system according to the present invention.
Figure 7:
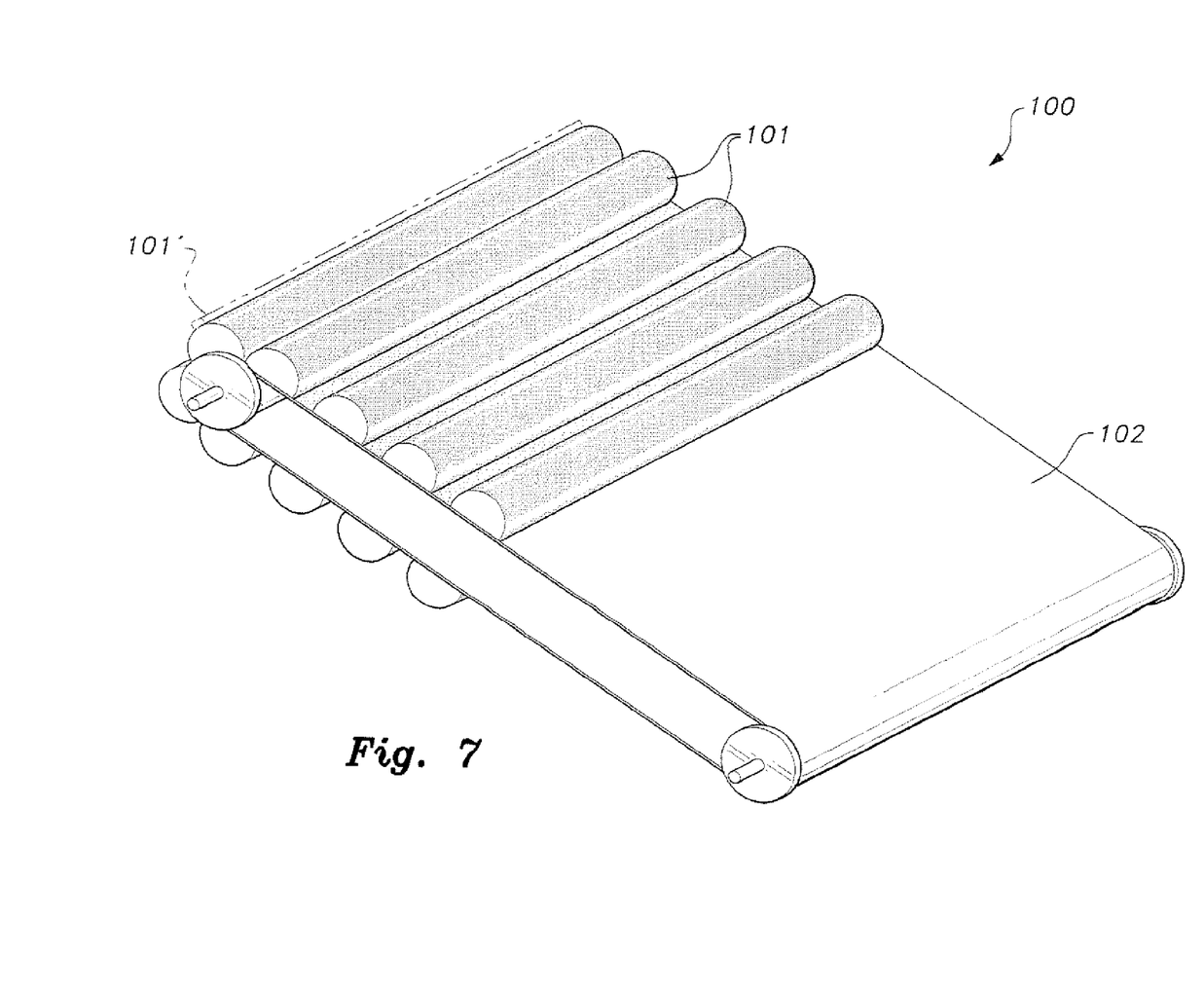
FIG. 7 is a perspective view of an alternative embodiment of a solar collector-reflector assembly of a solar collector-reflector system according to the present invention.
Figure 8:
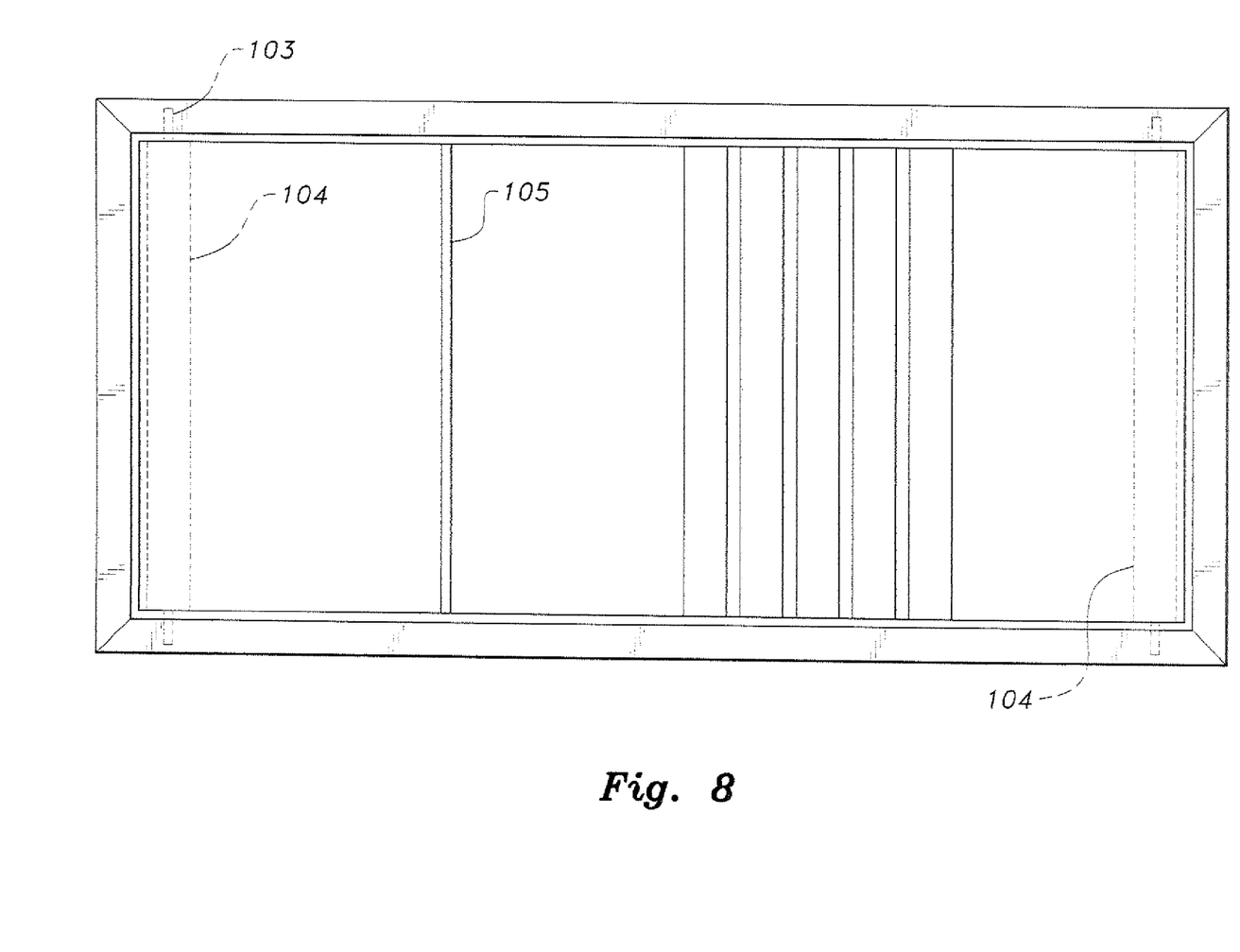
FIG. 8 is a top view of a modular solar panel incorporating the alternative solar collector-reflector assembly of FIG. 7.
Figure 9:
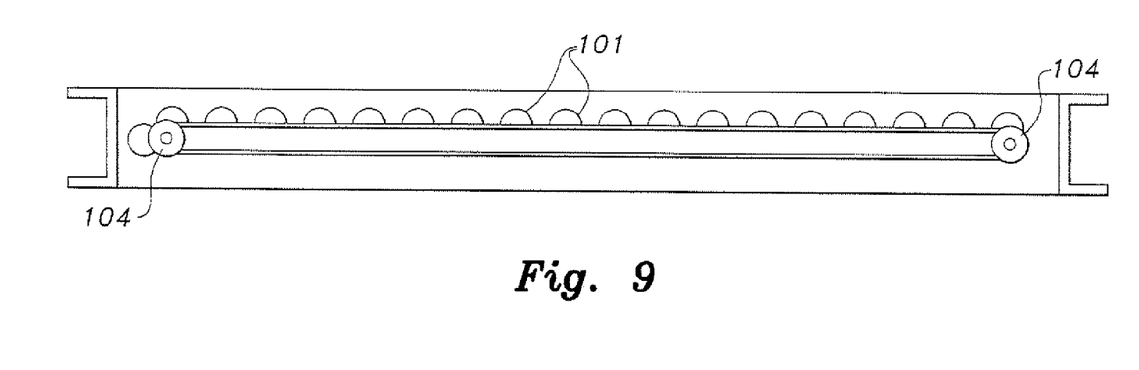
FIG. 9 is a side view of the alternative modular solar panel without the side frame member for a solar collector-reflector system according to the present invention.
Figure 10:
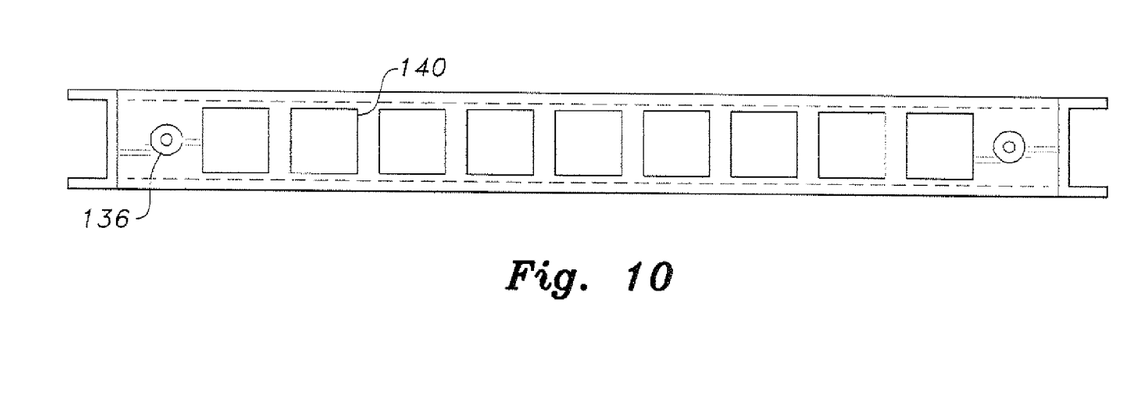
FIG. 10 is a side view of the alternative modular solar panel frame for a solar collector-reflector system according to the present invention.

Referring to FIG. 6, the solar collection-reflection tube 23 is an aluminum tube having two different surfaces. The reflection surface 24 is polished to reflect solar energy, i.e. reflecting mode, while the collection surface 25 may be black anodized to absorb the solar energy, i.e. heating mode.

Referring to FIGS. 7-10, these drawings disclose an alternative solar panel, which is lighter in weight. The solar collector-reflector assembly 100 includes an endless belt 102 preferably made of aluminized Mylar. The belt 102 rotates about rollers 104. Half the length of belt 102 is provided with black solar collector corrugations 101 which are heat-sealed to the reflective portion of the belt 102, i.e. the non-corrugated portion of the belt. Since Mylar has good thermal insulation characteristics, the surface temperature of the black portion will sustain higher temperatures when exposed to solar energy as compared to the aluminum tubes. One of the rollers 104 may be laterally spring loaded to maintain belt tension as well as compensating for thermal expansion. A drive mechanism may be attached to rod 103 through bearing 136 to thereby power the other roller 104 and the endless belt 102.

Figure 11:
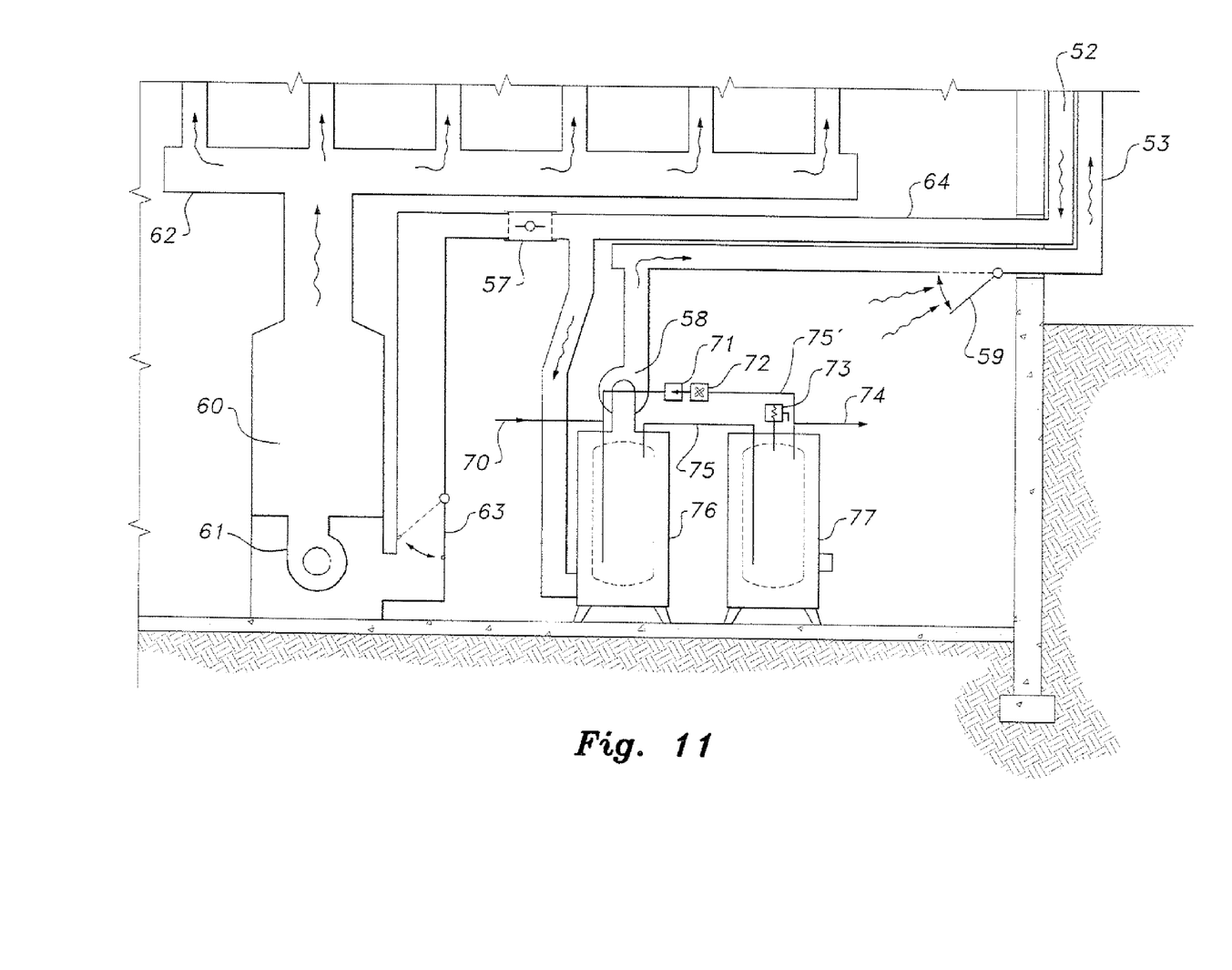
FIG. 11 is a partial diagrammatic view of a household heating/cooling system utilizing the solar collector-reflector system according to the present invention.
Figure 12:
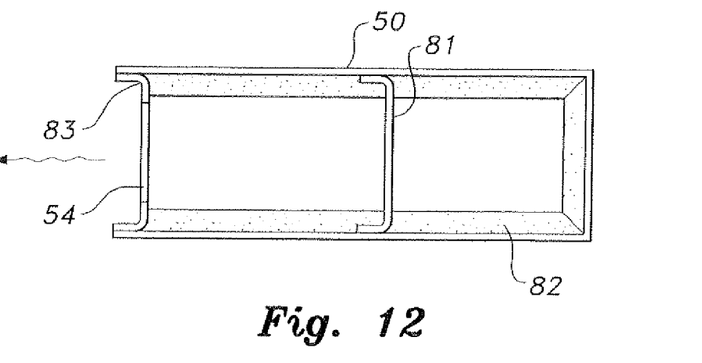
FIG. 12 is a section view of ducting (cooler air) from FIG. 1 for a solar collector-reflector system according to the present invention.
Figure 13:
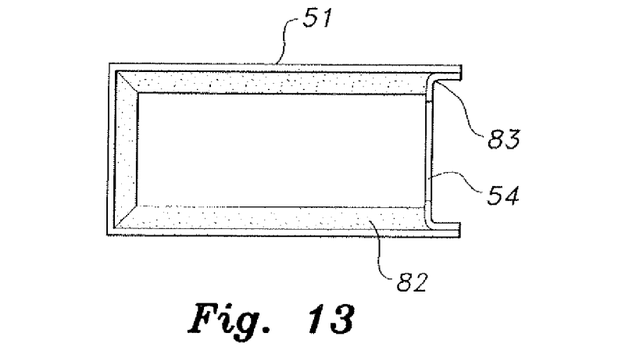
FIG. 13 is a section view of ducting (heated air) from FIG. 1 for a solar collector-reflector system according to the present invention.

Referring to FIGS. 1 and 11-14, all solar panels 20 may be gang mounted as shown and bolted to a series of parallel I-beams 53. Elastomeric gaskets 31 may be installed between each solar panel 20 to provide water and airtight seal. Each gasket is preferably made of extruded, silver pigmented Silicon rubber. An air inlet duct 50 includes longitudinal partition 81 and supplies airflow to the entire lower bank of solar panels. As shown in FIG. 12, the partition 81 separates the inlet duct 50 into two compartments. These dual compartments allow equalization of the air pressure drop through all the sloping rows of solar panels to thereby assure uniform heating in each sloping stack. Air outlet duct 51 includes a plurality of openings 54 for receiving the airflow up through all the panels. Both ducts may be lined with thermal insulating Styrofoam 82. The outer walls of the ducts are preferably made of polished aluminum or polished galvanized sheet metal.

Figure 14:
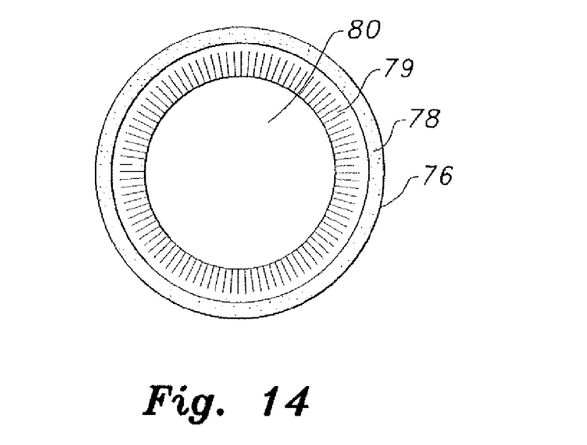
FIG. 14 is a section view of a supplemental water tank from FIG. 11 for a solar collector-reflector system according to the present invention.

To utilize the heating and reflecting capabilities of the solar collector-reflector system 10, external return duct 52 is connected to the existing return duct 64 to the furnace 60. Three valves 57, 59, 63 are provided into the existing duct. These valves are automatically cycled by a modified house thermostat. During the summer months, when air conditioning is utilized, valve 57 is motor operated into the closed position, rotating the vane into the vertical position while valve 63 is motor driven to the open position also sealing off duct 64 (as shown by dashed line) from the furnace 60. Normal operation of the furnace fan 61 draws house air in through valve opening 63, goes through the existing air conditioning heat exchanger in the furnace cabinet, and is distributed to all the rooms in the house via existing ducting 62. Also, during the summer months, potable water may be heated using the roof mounted solar panel array via the auxiliary tank 76. A modified thermostat located on the standard (existing) hot water heater 77 will automatically close the vane door of the motorized valve 59 (shown dashed) and energize the hot water tank fan 58 and the small low power centrifugal pump 72 which will circulate the water between the two tanks 76, 77. This action may also be controlled by sensing the temperature of the uppermost solar array duct whereby the temperature in the duct is higher than the low set point temperature of the water heater's thermostat. During the winter months, valves 57 and 59 will be open and valve 63 will be closed (as shown in solid line). House return air to the solar array system will flow through valve 59. This area, i.e. the basement, is normally the coldest part of the dwelling. The ducting leading from the window 56 to valve 57 and to the hot water heater will be thermally insulated, as well as the plumbing lines 75, 75' and the line above plumbing line 75 running between the two water tanks/heaters 76, 77. The cold-water inlet line 70 enters the auxiliary heater tank 76. From there, heated water will enter the standard heater tank 77. Check valve 71 only permits water flow from the standard tank heater 77 to the auxiliary tank heater 76. The existing pressure relief valve 73 protects both tanks.

Figure 15:
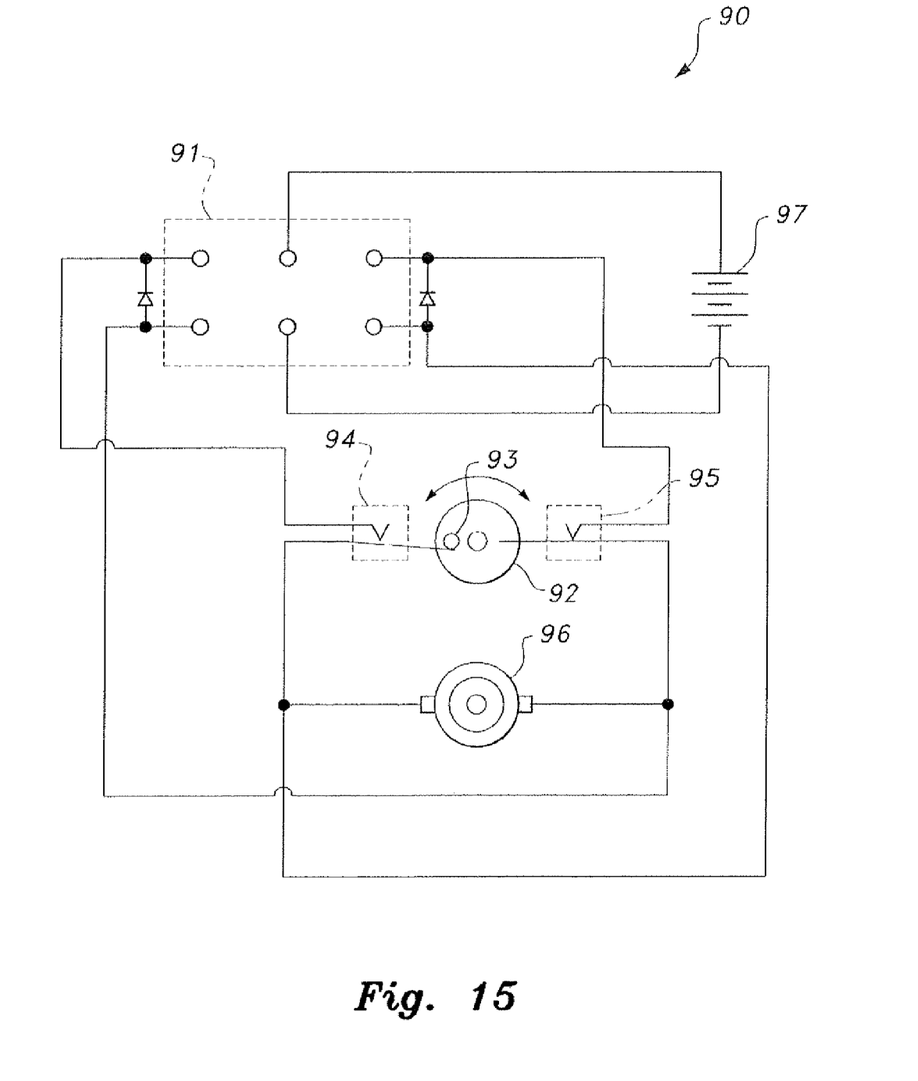
FIG. 15 is a schematic diagram of a controller for a solar collector-reflector system according to the present invention.

Referring to FIG. 15, this drawing schematically shows the controller 90 for synchronized rotation of the solar collector-reflector system 10 and the tubes 23. Switch 91 is a DPDT (Double Pole Double Throw) switch automatically cycled by the modified house thermostat. If the thermostat is set to the 'heat' position and the temperature sensor in the array indicates or senses a higher temperature than the set point temperature, power from the power supply is directed to the gear motor(s) 96 to rotate all array tubes 23 to the 'black side up' position. A cam wheel 92 located on the master powered solar panel has a cam stud 93, which rotates on the array tube's longitudinal axis. When the stud 93 engages a microswitch 94, power to the gear motor 96 is turned off and all array tubes will have rotated 180° with their black surfaces facing skyward. If the tubes are already in the 'black surface up' position, switch 94 is in the open circuit condition and the gear motor(s) is/are not energized. Both switches 94 and 95 are wired normally closed. If the thermostat is set in the 'cool' position, switch 91 is toggled to reverse polarity thereby supplying power to operate the gear motor(s) 96 in the opposite direction until the stud 93 engages microswitch 95. At this point all array tubes will have their reflective surfaces facing skyward. In order to minimize the heat gain of a roof that is already shingled, it is recommended that all areas of the roof not covered by array panels be clad with reflective aluminum sheet or polished galvanized sheet metal. For new building construction, polished cladding should be installed in lieu of colored shingles. Homes that already have galvanized metal sheet roofs should be painted with reflective silver, or at least white. They may also be polished in place.

Figure 16A:
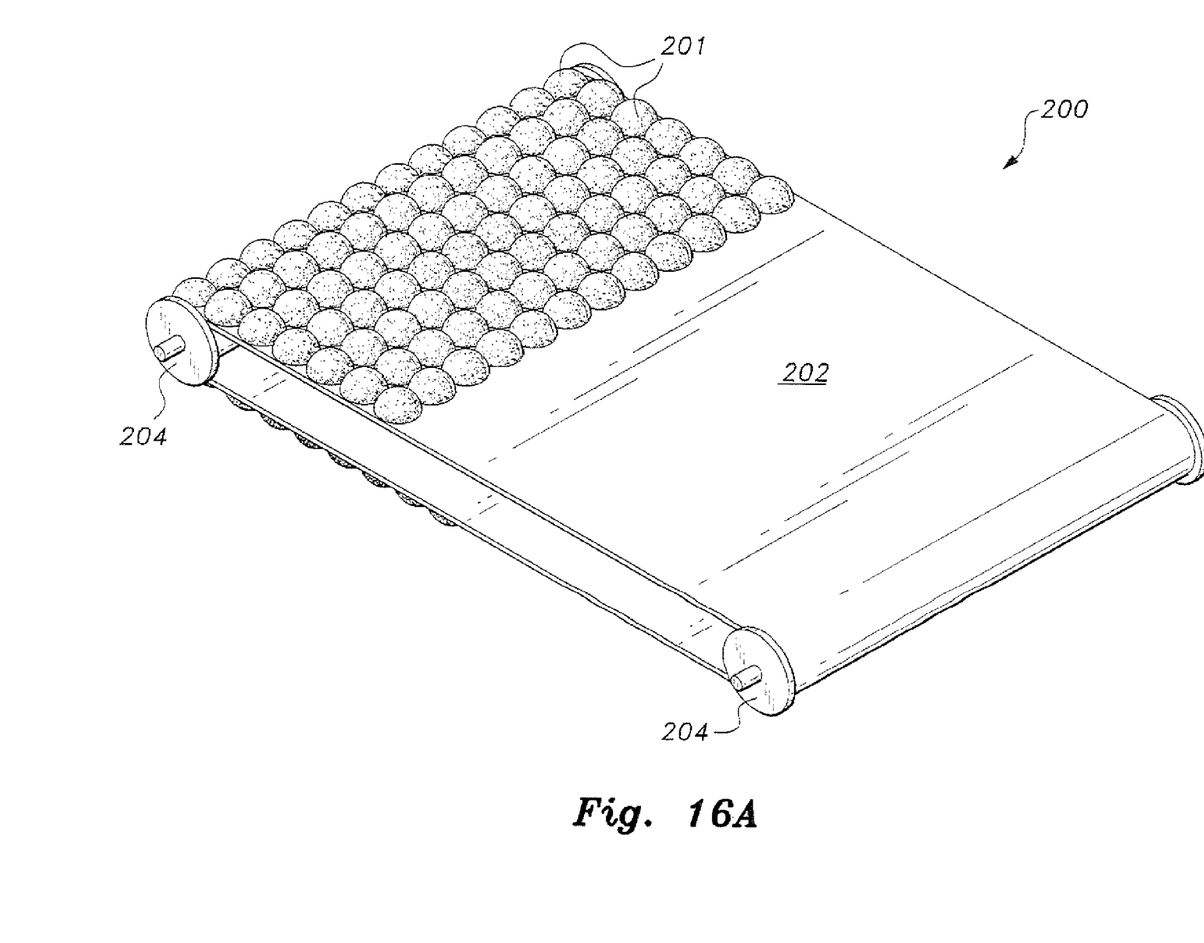
FIG. 16A is a perspective view of another alternative embodiment of a solar collector-reflector assembly of a solar collector-reflector system according to the present invention.

The solar collector reflector system 10 includes further alternative embodiments of a solar collector-reflector assembly for increased efficiency and thermo dynamic heat transfer. As shown in FIG. 16A, one further alternative solar collector-reflector assembly 200 includes an endless belt 202 trained and rotatable about rollers 204. Similar to the previously described solar collector-reflector assembly 100, the belt 202 is preferably constructed from aluminized Mylar for the excellent thermal insulation and reflective properties thereof. In this embodiment, about one-half the length of the belt 202 can be provided with a plurality of hemispherical balls or protrusions 201, while the remainder retains the reflective surface. The hemispherical balls 201 are preferably blackened in a similar manner described above to form a collection surface. Since a sphere has a maximum surface area compared to any other simple shape, the plurality of hemispherical balls 201 provide maximum surface area exposure to solar rays during operation thereby maximizing solar energy absorption and increasing efficiency. Additionally, the bumpy surface of the plurality of hemispherical balls 201 creates turbulent air flow. The solar collector-reflector assembly 200 operates in the same manner as the solar collector-reflector assembly 100.

Figure 16B:
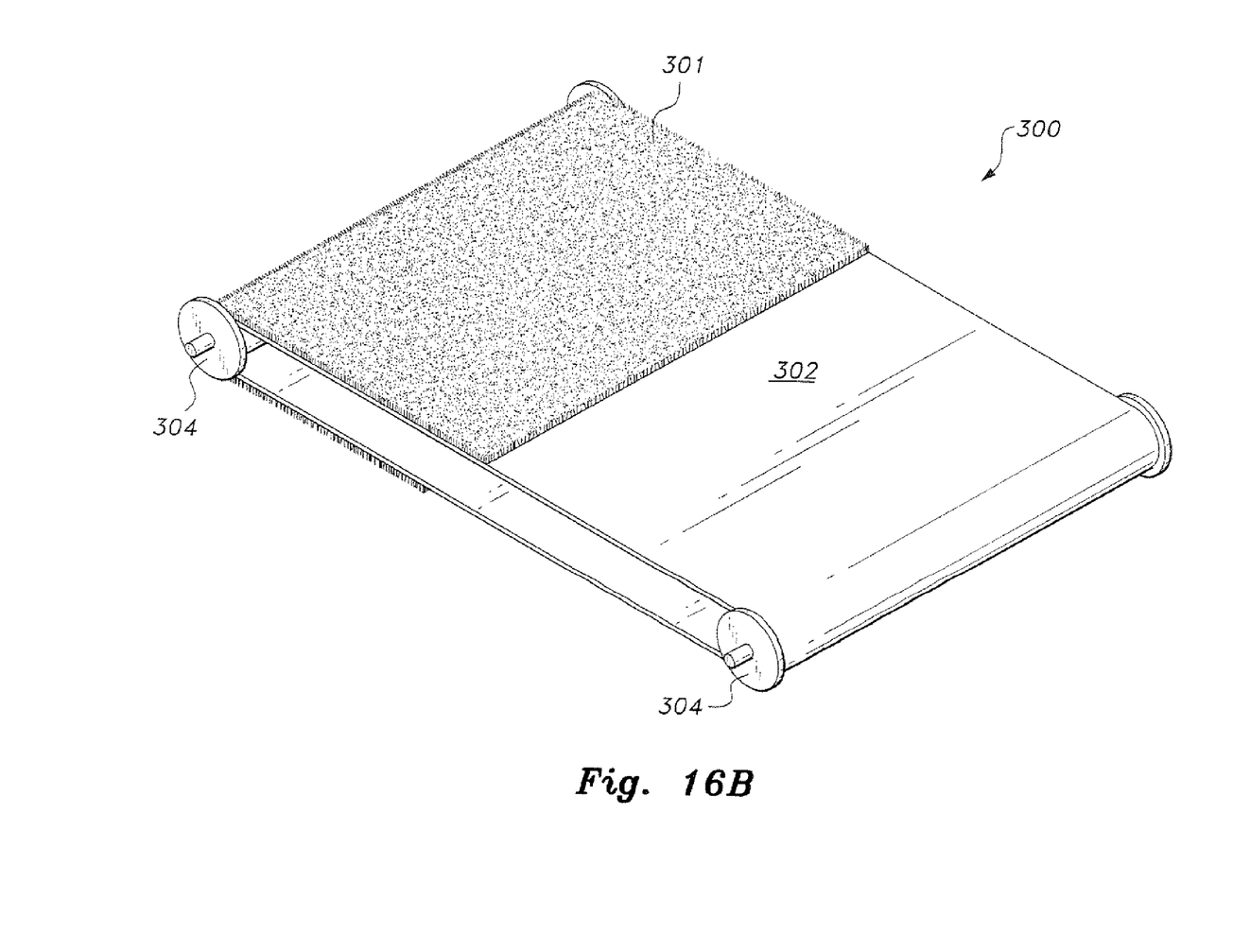
FIG. 16B is a perspective view of still further alternative embodiment of a solar collector-reflector assembly of a solar collector-reflector system according to the present invention.

Another further alternative solar collector-reflector assembly 300 based on the same principles of the assembly 200 is shown in FIG. 16B. The solar collector-reflector assembly 300 includes an endless belt 302 trained and rotatable about rollers 304. The belt 302 is preferably constructed from aluminized Mylar. In this embodiment, about one-half the length of the belt 302 can be provided with a plurality vertical fibers or protrusions 301, while the remainder retains the reflective surface. The fibers 301 are preferably blackened and constructed from materials such as various types of fabrics, polymers, lightweight metal and/or combinations thereof. Maximum surface area exposure can be obtained by user defined variance in size, shape and layout density of the fibers 301 on the belt 302. Moreover, the fibers 301 create turbulent air flow as the media flows over them. In all other respects, the solar collector-reflector assembly 300 operates in the same manner above with the other solar collector-reflector assemblies.

Figure 17:
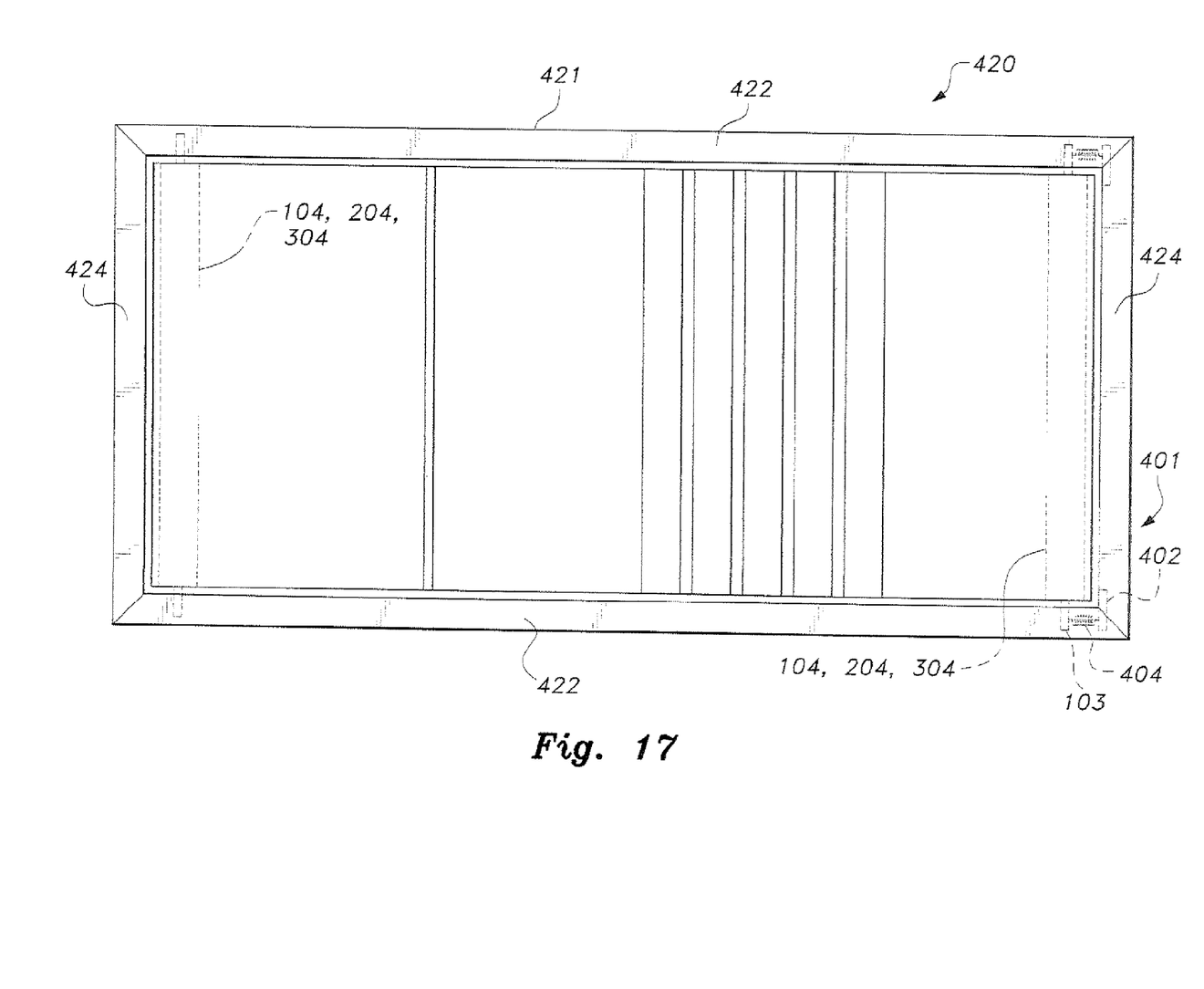
FIG. 17 is a top view of a further alternative modular solar panel that can incorporate the solar collector-reflector assemblies of FIGS. 7, 16A and 16B.
Figure 18A:
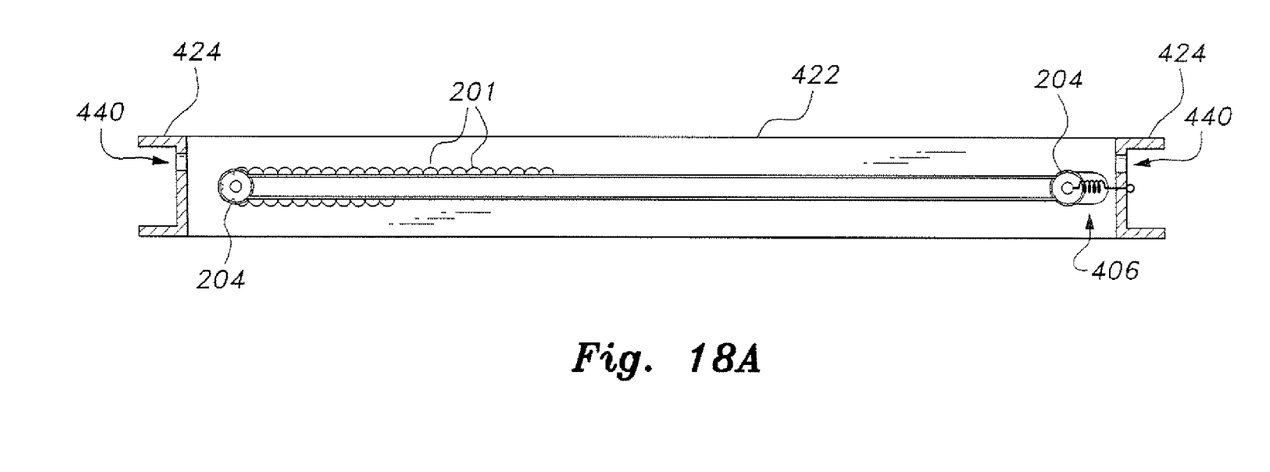
FIG. 18A is a side view in section of the modular solar panel of FIG. 17.
Figure 18B:
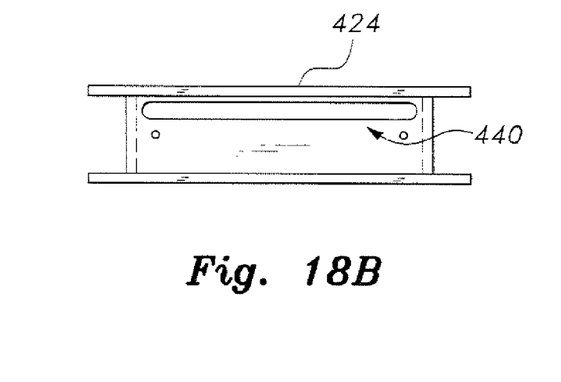
FIG. 18B is an end view of the modular solar panel of FIG. 17.

FIGS. 17-18B disclose an alternative solar panel 420. In this embodiment, the solar panel 420 can accommodate any of the solar collector-reflector assemblies described above. The solar panel 420 includes a housing 421 defined by oppositely disposed side frame members 422 and oppositely disposed end frame members 424. As mentioned previously, at least one of the rollers 104, 204, 304 must be tensioned in order to maintain properly trained alignment of the respective belts 102, 202, 302 and to compensate for thermal expansion thereof. In that regard, the solar panel 420 includes a belt tension mechanism or assembly 401. The belt tension mechanism 401 includes a pair of brackets 402 that are each disposed near the ends of one of the frame members 424. The shaft or rod 103 of one of the rollers, e.g., roller 304, is mounted through an elongate slot 406 in each frame member 422. A biasing means, such as a spring 404, is connected to a respective end of the shaft 103 and the bracket 402. Thus, the elongate slots 406 permit limited movement of the roller 104, 204, 302 for tensioning the belt 102, 202, 302 via the spring 404. Various tension springs can be used to facilitate tensioning of the belt 102, 202, 302, such as leaf springs, coil springs, and the like. It is noted that positive tension setting means, such as a tension bolt interconnecting a biased connection between the shaft end and the bracket, can also be used so that a desired tension can be set by tightening or loosening the bolt. However, the variance in thermal expansion and contraction of the belt can be relatively large during operation, and a preset tension may cause the belt to exceed its elastic limit and undesirably deform. Hence, careful consideration must be exercised when using such tension setting mechanisms.

The solar panel 420 also includes features for more efficient thermal transfer. As shown in FIGS. 18A and 18B, each end frame member 424 includes at least one circulation opening 440. Unlike the openings 40, 140, the openings 440 are narrow and disposed on the upper half of the frame member 424 so that air will circulate along the length and top surface of the belt 102, 202, 302. This configuration maximizes heat transfer by concentrating air flow on the hottest area of the belt and minimizing heat loss through the cooler underside of the belt. Some or all the interior surface of the housing 421 can be reflective or mirrored to reflect solar rays onto the black surface when the sun is at an acute angle to the solar panel 420. In addition, it is preferable that the solar panel 420 and the various solar collector-reflector assemblies 100, 200, 300 be constructed from lightweight yet strong materials that conform to building codes and structural load parameters.

It is noted that the solar collector reflector system encompasses a variety of alternatives. For example, the blackened surfaces of the tube 23 and the belt 102 may include a plurality of raised surfaces to increase the area of solar energy absorption. As shown in FIG. 6, the collection surface 25 may include black tinsel strips and/or tufts 25' along the length of the tube 23 to effectively increase the blackened surface area. Similarly, the blackened corrugations 101 may also include black tinsel strips and/or tufts 101'. While the raised surfaces have been disclosed as strips, other shapes such as rounded or geometric shaped protrusions in a variety of patterns may also be viable to increase surface area. In light of this configuration, the raised surfaces help create turbulence in the airflow which increases the heat transfer coefficient in addition to increasing the rate of heat absorption due to the larger area.

It is to be understood that the present invention is not limited to the embodiments described above, but encompasses any and all embodiments within the scope of the following claims.

I claim:

1. A solar collector reflector system, comprising:
   at least one modular, enclosed solar panel, the solar panel having a selectively operable solar collector-reflector assembly and a transparent cover, the solar panel including means for permitting media to flow over the solar collector-reflector assembly, the solar collector-reflector assembly having distinct surfaces for collecting or reflecting solar energy to transfer heat to media, the solar collecting surface including protrusions throughout the collecting surface to increase the solar energy collection surface area and induce turbulence in media flow;
   a driver assembly to drive the solar collector-reflector assembly, wherein the driver assembly includes a drive roller, an idler roller, and an endless belt rotatable about the drive roller and the idler roller, the endless belt having said protrusions, said protrusions being a plurality of black hemispherical balls disposed on about one-half the length of the belt for maximal surface area exposure to the sun, the remaining half of the belt having a solar reflection surface; and
   a controller selectively actuating the driver assembly, the controller having means for sensing differential temperatures.

2. A solar collector reflector system, comprising:
   at least one modular, enclosed solar panel, the solar panel being rectangular and having a selectively operable solar collector-reflector assembly and a transparent cover, the solar panel including means for permitting media to flow over the solar collector-reflector assembly, the solar collector-reflector assembly having distinct surfaces for collecting or reflecting solar energy to transfer heat to media, the solar collecting surface including protrusions throughout the collecting surface to increase the solar energy collection surface area and induce turbulence in media flow;
   a driver assembly to drive the solar collector-reflector assembly, wherein the driver assembly includes a drive roller, an idler roller, and an endless belt rotatable about the drive roller and the idler roller, the endless belt having said protrusions, said protrusions being a plurality of black hemispherical balls disposed on about one-half the length of the belt for maximal surface area exposure to the sun, the remaining half of the belt having a solar reflection surface;
   ducting; and
   a controller selectively actuating the driver assembly, the controller having means for sensing differential temperatures.

3. The solar collector reflector system according to claim 2, wherein said media is air.

4. The solar collector reflector system according to claim 3, wherein said driver assembly comprises:
   a drive torque rod extending along the length of the solar panel;
   bearing support angles for supporting the torque rod along the length thereof;
   gears between the drive torque rod and the solar collector-reflector assembly; and
   a motor for driving the drive torque rod.

5. The solar collector reflector system according to claim 4, further comprising a plurality of solar panels arranged in an array, the array being operatively connected to a dwelling air circulation system.

6. The solar collector reflector system according to claim 5, further comprising a plurality of couplings interconnecting adjacent drive assemblies, the motor driving the entire array.

7. The solar collector reflector system according to claim 5, wherein said ducting comprises:
   an air inlet duct supplying airflow to the entire array,
   a partition separating the inlet duct into two compartments for equalizing air pressure drop along the array to ensure uniform heating; and
   an air outlet duct having a plurality of openings for receiving the airflow through all the panels.

8. The solar collector reflector system according to claim 7, wherein said ducting is thermally insulated.

9. The solar collector reflector system according to claim 7, wherein during a heating mode, air is circulated in a closed loop through said array and the dwelling.

10. The solar collector reflector system according to claim 7, wherein air is circulated in a closed loop through said array and thermally insulated air ducting to at least one water heat exchanger.

11. The solar collector reflector system according to claim 2, wherein said controller is adapted for selectively actuating blowers and valves in a dwelling air system based upon the sensed differential temperatures.

12. The solar collector reflector system according to claim 2, wherein said means for permitting media to flow over the solar collector-reflector assembly comprises a plurality of media circulating openings formed on opposing sides of said solar panel, the openings on one side being in line with the openings on the other side, the openings directing airflow over surfaces exposed to the sun and sky.

13. The solar collector reflector system according to claim 2, wherein said solar panel comprises a belt tensioning mechanism attached to one side of said solar panel, the belt tensioning mechanism maintaining tension on said endless belt through thermal expansion and contraction thereof.

\* \* \* \* \*